Dec. 1, 1925.  1,563,471

H. CLEMENT

DIAGNOSTIC INSTRUMENT

Filed April 26, 1924

Inventor
Hans Clement
By his Attorneys
Stockridge & Borst

Patented Dec. 1, 1925.

1,563,471

UNITED STATES PATENT OFFICE.

HANS CLEMENT, OF NEW YORK, N. Y., ASSIGNOR TO GENERAL OPTICAL COMPANY, INC., A CORPORATION OF NEW YORK.

DIAGNOSTIC INSTRUMENT.

Application filed April 26, 1924. Serial No. 709,285.

*To all whom it may concern:*

Be it known that I, HANS CLEMENT, a citizen of the United States, residing at New York city, in the county of New York and State of New York, have invented certain new and useful Improvements in Diagnostic Instruments, of which the following is a full, clear, and exact description.

My invention relates to optical diagnostic instruments, such as skiascopes, retinoscopes and opthalmoscopes, and particularly to illuminated instruments of this character, that is, instruments in which the source of illumination is self-contained, as distinguished from the reflecting type of instrument in which the source of illumination is external to the instrument.

One of the difficulties with such instruments has been to get at all times a sharp, clearly defined, round spot of light for examination purposes. It has been common practice to dispose one or more lenses in the objective tube and to provide adjustment for the proper focussing of the light either by adjusting the tube with the light stationary or by adjusting the source of light up and down within a stationary tube.

The difficulty in getting a properly defined spot of light has been due in a large measure to the difference in the length and relative disposition of the lamp filament. It is essential always to be able to collect the rays of light from a filament upon the objective lens and to obtain this result it is necessary that the collecting lens or lenses be properly disposed over the particular filament. Under such a condition, a desirable focus of the light for examination purposes can be obtained by adjusting the source of light and the collecting lens in their distance from the objective lens.

In accordance with my invention, I so mount the collecting lens upon the lamp base that it may be adjusted toward and from the lens in order to properly control all of the lights rays emitted by the particular lamp filament, and I then provide means for adjusting the distance of the objective lens from the source of light and from the collecting lens. Preferably, the lamp base is provided with screw threads, and the collecting lens is mounted in the end of a sleeve which is internally screw threaded and which fits over the lamp and engages the screw threads on the lamp base. In this way the proper adjustment of the collecting lens can be obtained before the lamp is inserted into the objective tube.

I shall now describe the illustrated embodiment of my invention and shall thereafter point out my invention in claims.

Figure 1:
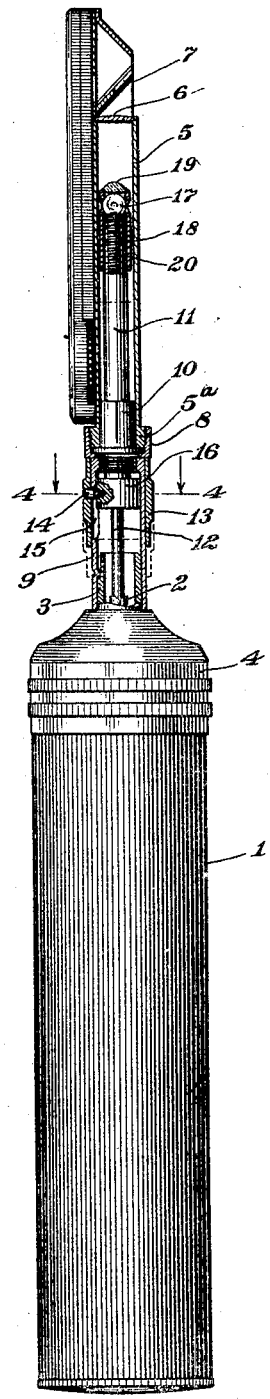
Fig. 1 is an elevation, partly in section, of an ophthalmoscope embodying my invention.
Figure 2:
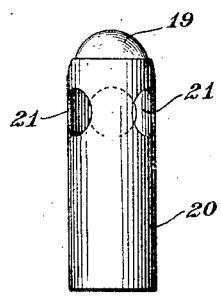
Fig. 2 is an enlarged detail in elevation of the collecting lens holder.
Figure 3:
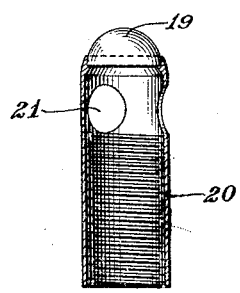
Fig. 3 is a central vertical section of the same.
Figure 4:
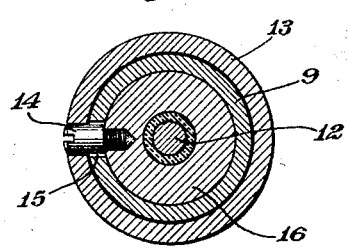
Fig. 4 is a horizontal section through the instrument on the line 4—4 of Figure 1.

I have illustrated my invention in connection with an ophthalmoscope which the usual hollow handle 1 in which is contained the battery and which has the usual concentric tubular positive and negative terminals 2 and 3, respectively. A rotary switch 4 controls the circuit.

The usual objective tube 5 has in its outer end an objective lens 6 and a reflecting mirror 7, in which is a slit forming a sight opening for observation purpose. The objective tube has a screw threaded enlargement 5ª at its lower end, which, in the assembling of the parts, is engaged by a coupling nut 8 on the upper end of a sleeve 9. The upper end of this sleeve 9 is internally screw threaded, into which is screwed a guide and contact sleeve 10. A circumferential flange on this sleeve 10 just above its screw threaded lower end bears on top of an inturned flange on the lower end of the coupling nut 8, and thus serves to secure the coupling nut in place on the upper end of the sleeve 9, while at the same time allowing freedom of rotation to the coupling nut. The sleeve 9 fits over the negative tubular contact or terminal 3 and is secured thereon by a bayonet slot connection.

Slidable within the sleeve 10 is a metallic stem 11, which serves as the lamp socket. The stem 11 is tubular and has an internal, insulated, elongated solid stem 12 which enters into the positive contact 2.

This socket member composed of the outer tube 11 and axial insulated stem 12, is adjustable up and down in the objective tube, the stem 12 being long enough to remain in contact with the terminal 2 in all positions of adjustment. To effect this adjustment of the socket member, a band 13 slidably fits over the sleeve 9 and has mechanical connection with the socket member through a screw 14 which passes through a longitudinal slot 15 in the sleeve 9 and screws into a cylindrical boss 16 on the lower end of the tubular stem 11, the boss being of such size as to have a sliding fit within the sleeve 9. A miniature electric lamp of usual construction for such instruments, including the bulb 17 and base 18 screws into the outer end of the socket member. The terminals to which the filament of the lamp is connected lead to the base and to a central insulated contact point, the former making electrical contact with the tube 11, and the latter making electrical contact with the central insulated stem 12. The circuit for the filament will, therefore, be from the positive battery terminal 2 through the stem 12, thence through the filament to the base 18, tube 11, contact sleeve 10 and sleeve 9 to the negative terminal 3.

A collecting lens 19 is mounted in the end of a tube or cap 20 of the proper size to fit over the lamp and lamp base. The lamp base 18 is provided with screw threads, and the collecting lens tube 20 is internally screw threaded and is adapted to screw upon the lamp base 18. The tube 20 is of the proper size to enter into the objective tube 5. The tube 20 is applied to the lamp base by inserting its open end over the lamp and screwing it down the desired extent, the proper position being determined by tests in each case. In this way the collecting lens and its holder are susceptible of very slight adjustment relative to the lamp, and after they are properly adjusted, there is no likelihood of their getting out of adjustment while they remain within the objective tube. The tube 20 is preferably provided just back of the collecting lens with a series of ventilation openings 21.

The proper relative adjustment of the collecting lens and the lamp must, of course, be made before the objective tube 5 is put on and attached to the sleeve 9 by the coupling nut 8. Thereafter the proper focal adjustment for the light rays is accomplished by operating the band 13 and sliding the lamp and the collecting lens up and down in the tube 5 to vary their distance from the objective lens. By this means a very sharply defined spot of light can be obtained.

It is obvious that various modifications in the details and arrangement of parts herein described and illustrated for the purpose of explaining the nature of the invention, may be made by those skilled in the art within the principle and scope of the invention as expressed in the appended claims.

I claim:

1. A diagnostic instrument comprising a handle having battery contacts, a tube carried by the handle, an objective lens in the outer end of the tube, a lamp within the tube having electrical contact with the battery contacts, a condensing lens having screw threaded connection with the lamp mount and adjustable thereon to vary its distance from the lamp filament, and means to adjust the distance of the objective lens from the lamp and condensing lens.

2. A diagnostic instrument comprising a handle having battery contacts, a tube carried by the handle in fixed relation thereto, an objective lens in the outer end of the tube, a lamp socket slidable in said tube and having electrical contact with the battery contacts in all positions of adjustment, a lamp in the lamp socket including a screw threaded base external of the socket, a screw threaded sleeve fitting over the lamp and engaging the screw threads of the base, and a condensing lens in the outer end of the sleeve.

3. A diagnostic instrument comprising a handle having battery contacts, a tube carried by the handle in fixed relation thereto, an objective lens in the outer end of the tube, a lamp socket slidable in said tube and having electrical contact with the battery contacts in all positions of adjustment, a lamp in the lamp socket including a screw threaded base external of the socket, a screw threaded sleeve fitting over the lamp and engaging the screw threads of the base and having ventilation openings near its outer end, and a condensing lens in the outer end of the sleeve beyond the ventilation openings.

In witness whereof, I hereunto subscribe my signature.

HANS CLEMENT.